US007809064B2

(12) United States Patent
Chen et al.

(10) Patent No.: US 7,809,064 B2
(45) Date of Patent: Oct. 5, 2010

(54) SYSTEMS AND METHODS OF FLEXIBLE POWER MANAGEMENT APPLICABLE TO DIGITAL BROADCASTING

(75) Inventors: Ching-Yung Chen, Hsinchu (TW); Fang-Chu Chen, Hsinchu (TW); Chih-Chun Feng, Hsinchu (TW); Ce-Min Fang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 1531 days.

(21) Appl. No.: 11/140,309

(22) Filed: May 27, 2005

(65) Prior Publication Data

US 2006/0104348 A1 May 18, 2006

Related U.S. Application Data

(60) Provisional application No. 60/627,166, filed on Nov. 15, 2004.

(51) Int. Cl.
*H04N 7/12* (2006.01)
*H04N 7/173* (2006.01)

(52) U.S. Cl. .................................. 375/240.26; 725/112

(58) Field of Classification Search ............ 375/240.26; 709/230; 725/112
See application file for complete search history.

(56) References Cited

U.S. PATENT DOCUMENTS

| | | | | |
|---|---|---|---|---|
| 7,032,236 | B1 * | 4/2006 | Ozkan et al. | 725/39 |
| 7,072,971 | B2 * | 7/2006 | Lassen et al. | 709/230 |
| 7,536,705 | B1 * | 5/2009 | Boucher et al. | 725/112 |
| 2003/0081580 | A1 | 5/2003 | Vaidyanathan et al. | |
| 2003/0152107 | A1 | 8/2003 | Pekonen | |
| 2003/0153369 | A1 | 8/2003 | Laiho et al. | |
| 2003/0166392 | A1 | 9/2003 | Laiho et al. | |

OTHER PUBLICATIONS

"Digital Video Broadcasting (DVB); Transmission System for Handling Termnals (DVB-H)", *Final Draft ETSI EN 302 304*, V1.1.1, pp. 1-14, (2004).
"Digital Video Broadcasting (DVB); DVB Specification for Data Broadcasting", *Final Draft ETSI EN 301 192*, V1.4.1, pp. 1-78, (2004).

* cited by examiner

*Primary Examiner*—Gims S Philippe
(74) *Attorney, Agent, or Firm*—Alston & Bird LLP

(57) ABSTRACT

A system for receiving a digital broadcast includes an input terminal that receives the digital broadcast containing scalable data, and a controller for controlling an operation mode of the system. In addition, the system may also include a processor that decodes the data, and a power management device that varies the amount of data to be decoded according to the operation mode.

12 Claims, 14 Drawing Sheets

Fig. 9c

Video frame →

FGS significance level ↓

| | | | | | | | | |
|---|---|---|---|---|---|---|---|---|
| p(1,1) | p(2,1) | p(3,1) | p(4,1) | p(5,1) | p(6,1) | p(7,1) | p(8,1) | p(9,1) |
| p(1,2) | p(2,2) | p(3,2) | p(4,2) | p(5,2) | p(6,2) | p(7,2) | p(8,2) | p(9,2) |
| p(1,3) | p(2,3) | p(3,3) | p(4,3) | p(5,3) | p(6,3) | p(7,3) | p(8,3) | p(9,3) |
| p(1,4) | p(2,4) | p(3,4) | p(4,4) | p(5,4) | p(6,4) | p(7,4) | p(8,4) | p(9,4) |
| p(1,5) | p(2,5) | p(3,5) | p(4,5) | p(5,5) | p(6,5) | p(7,5) | p(8,5) | p(9,5) |
| p(1,6) | p(2,6) | p(3,6) | p(4,6) | p(5,6) | p(6,6) | p(7,6) | p(8,6) | p(9,6) |

SYSTEMS AND METHODS OF FLEXIBLE POWER MANAGEMENT APPLICABLE TO DIGITAL BROADCASTING

CROSS-REFERENCE TO RELATED APPLICATIONS

This application claims the benefit of U.S. Provisional Patent Application No. 60/627,166, filed Nov. 15, 2004

BACKGROUND OF THE INVENTION

The present invention relates generally to systems and methods of flexible power management, and more specifically, to systems and methods of flexible power management applicable to digital broadcasting.

The research, development, and promotion of digital broadcasting, including digital TV (DTV) broadcasting, have made digital broadcasting a much more popular and acceptable form of broadcast. Replacing the conventional analog channels and programs with their digital renditions is only one of many DTV's intrinsic features. As many other industries, such as internet and mobile communication one trend is to adequately integrate digital broadcasting with other fields and applications of technologies and services. One of those attempts includes using a handheld device to receive and decode digital broadcasting signals, thereby allowing consumers to enjoy digital broadcasting services anywhere and anytime. Such application brings the applications of digital broadcasting to a new level not reached by the conventional devices. Among other efforts, a new Digital Video Broadcasting-Handheld (DVB-H) standard has been proposed.

There are, of course, many differences between receiving a DTV program from a home DTV set and from a personal handheld device. For example, the display of the former is typically of larger size than that of the latter, which also has limited power. Among others, power consumption is an important consideration for handheld devices, because a handheld device gets its power from an energy-limited battery instead of a wall outlet. Therefore, an energy efficient process is required for DTV broadcasting to handheld devices.

Referring to FIG. 1A, in the case of Digital Video Broadcasting-Terrestrial (DVB-T) system, all services (or programs) within one channel are uniformly multiplexed based on capacity division multiplexing (CDM) into a single transport stream (TS), which is then modulated and transmitted. The receiver has to demodulate the received signal all the time even though most viewers usually need only one service at a time. Processing information of all services, particularly the non-selected services, unnecessarily consumes more power. Obviously, receivers in the DVB-T system always suffer from a waste of power due to the above arrangement for steaming.

Referring to FIG. 1B, to reduce the average receiver power consumption, the DVB-H system introduces a scheme based on time division multiplexing (TDM), known as "time-slicing", for multimedia streaming. For example, DVB-H uses a time-slicing based mechanism to put different services, which may be distinctive DTV programs, at distinctive time slots. Accordingly, a receiver only needs to process the information at and near the intervals where the viewer-selected-service(s) are present. Indeed, the receiver may deactivate most of the processing functions or enter into a "sleeping" mode during most of the remaining intervals. For example, referring to FIG. 1C, the burst duration indicates the duration where a receiver is activated to process the information. During the remaining duration, such as the off-time duration shown in FIG. 1B, most of the signal processing functions may be deactivated to reduce consumption of power. This mechanism has been approved as part of DVB-H's standard. Nevertheless, it should be noted that time-slicing provides the solution of only power saving rather than power management. That is, the problem with DVB-H'H's service-based time-slicing mechanism is a lack of flexibility for power management. Under certain circumstances, the power consumption of processing only one service may still be too much for certain systems. Therefore, there remains a need for systems and methods that provide flexibility in power management.

BRIEF SUMMARY OF THE INVENTION

A scheme of making use of scalable multimedia coding over a service-based time-slicing scheme in a digital transmission system may allow receivers to autonomously or flexibly manage their power consumption.

A system for receiving a digital broadcast in one example may include: an input terminal capable of receiving the digital broadcast containing scalable data; a controller for controlling an operation mode of the system; a processor capable of decoding the data; and a power management device capable of varying the amount of data to be decoded according to the operation mode.

A digital broadcasting system in one example may include: a signal source capable of providing digital data containing at least one of audio data and video data; and a data processing device capable of partitioning the digital data into at least two sections of partitioned data having different significance.

A power management method for a receiving system of a digital broadcast in one example may include: providing the digital broadcast containing scalable data; selecting an operation mode of the system; and varying the amount of data to be processed by the receiving system according to the operation mode selected.

A digital broadcasting method in one example may include: providing data containing at least a first broadcast service and a second broadcast service; encoding the first broadcast service and the second broadcast service; placing a sequence of the encoded first service and a sequence of the encoded second service at distinct time intervals; and partitioning the sequence of the encoded first service into at least two sections of partitioned data according to the significance of the encoded data of the encoded first service.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIGS. 9*a*-9*d* illustrate an exemplary approach for partitioning bitstream frames in examples consistent with the present invention.

DETAILED DESCRIPTION OF THE INVENTION

Figures 1A, 1B, 1C:
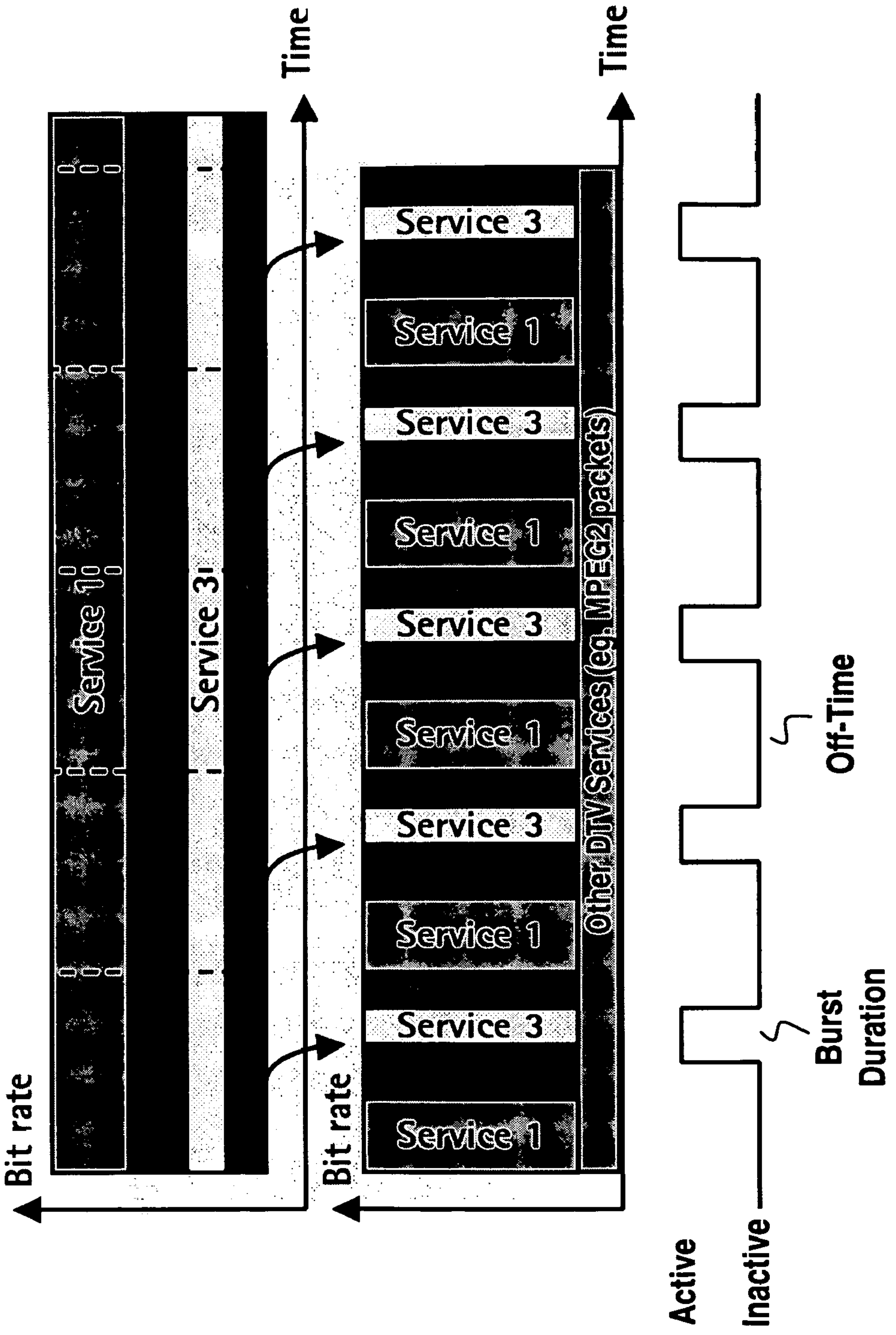
Fig. 1a (Prior Art)
Fig. 1b (Prior Art)
Fig. 1c (Prior Art)
FIG. 1*a* illustrates a schematic diagram of exemplary DVB-T broadcast signals in the prior art.
FIG. 1*b* illustrates a schematic diagram of exemplary DVB-H broadcast signals in the prior art.
FIG. 1*c* illustrates an exemplary timing diagram to illustrate the burst durations for decoding exemplary DVB-H broadcast signals in the prior art.
Figure 2:
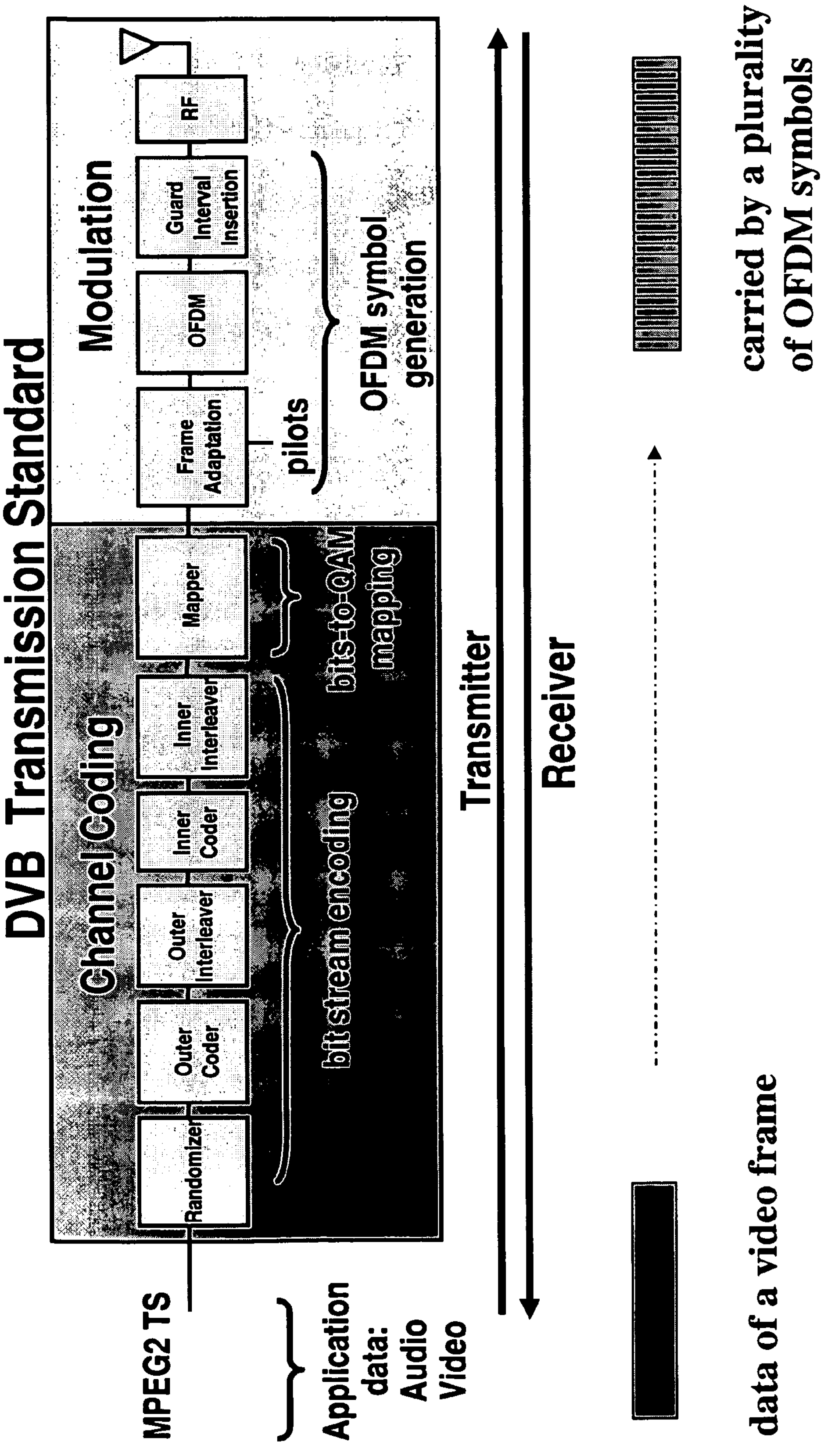
FIG. 2 illustrates an exemplary block diagram of a broadcasting or a receiving system in examples consistent with the present invention.

According to the present invention, a scheme of making use of scalable multimedia coding over a service-based time-slicing scheme in a digital transmission system may be provided to allow receivers autonomously and flexibly managing their power consumption. It is to be understood that the present invention may be implemented in various forms of hardware, software, firmware, special purpose processors, or a combination thereof.

It is to be further understood that, because some of the constituent system components and method steps depicted in the accompanying figures are preferably implemented in a combination of hardware and software, the actual connections between the system components (or the process steps) may differ depending upon the manner in which the present invention is programmed. Given the teachings herein, one of ordinary skill in the related art will be able to contemplate these and similar implementations or configurations of the present invention.

Examples illustrated below relate to systems and methods of power management applicable to DTV systems. In one example, systems such as systems for receiving digital broadcast may be operated differently under two or more different modes to facilitate power management. For example, a system may be operated under a power-saving mode that requires less data processing resources or less processor on-time, which in turn consumes less power. In some examples, systems or methods having a coding mechanism based on significance of digital data may be employed to facilitate flexible power management. In particular, a system may process only a portion of the data that has more significance to reduce power consumption. In one example, scalable coding may be used.

Additionally, examples illustrated below may be applicable to digital broadcasting, including DTV systems and handheld devices. A power-limited or battery-operated device may employ the examples of systems or methods illustrated below for processing information of digital broadcasting. For example, when a device has detected that the remaining power of the battery is limited, the device may, with or without the instructions from the user, enter into a power-saving mode to extend service time. The power management may extend the service time for the user to watch video program or listen to an audio program. In one example, a power-saving mode may be achieved with reduced processing power or reduced processing time. Such change may reduce video and/or audio quality due to the reduction in the information processed and presented. However, by adequately selecting operational modes and decoding the data according to its significance, the reduction in quality may become minimal or less apparent to viewers.

An analog video (or audio) generally consists of many motion pictures (or waveforms) occurring consecutive in time. Take video as an example for ease of presentation. After sampling, digitizing and source encoding to the video, each picture's information will be digitized and compressed into a (video) frame of information bits. A bitstream is a stream of information bits consisting of many frames juxtaposed in time. A scalable coding, such as fine granular/grain scalability (FGS) coding proposed by Moving Picture Expert Group (MPEG), place more significant or important information of a compressed data closer to the beginning of each bitstream frame. Therefore, even if some end portions of a bitstream are truncated, the remaining part of a bitstream frame can still be decoded to obtain most relevant or some video and/or audio information. The decoded information, although incomplete, may remain acceptable or intelligible to a viewer.

A scalable coding, such as scalable bitstream coding, may be used in bandwidth management, e.g. to avoid over-occupying the limited bandwidth with too much data. It may also be used for power management, e.g. to reduce power consumption by processing only a portion of the data. In one example, a power-limited device may truncate or choose to receive only a part of the bitstream frame to avoid processing the data in its entirety and to consume less power.

An exemplary bitstream frame may be distributed over multiple time slices, each carrying continuous portions of a bitstream frame with different levels of significance. Therefore, when a certain operation mode is selected to reduce power consumption, a system may ignore less significant portions of data or skip data processing during the intervals corresponding to those data portions. For example, a system may skip data processing over all layers, including from source decoding in the application layer to channel decoding in the physical layer.

Figure 3:
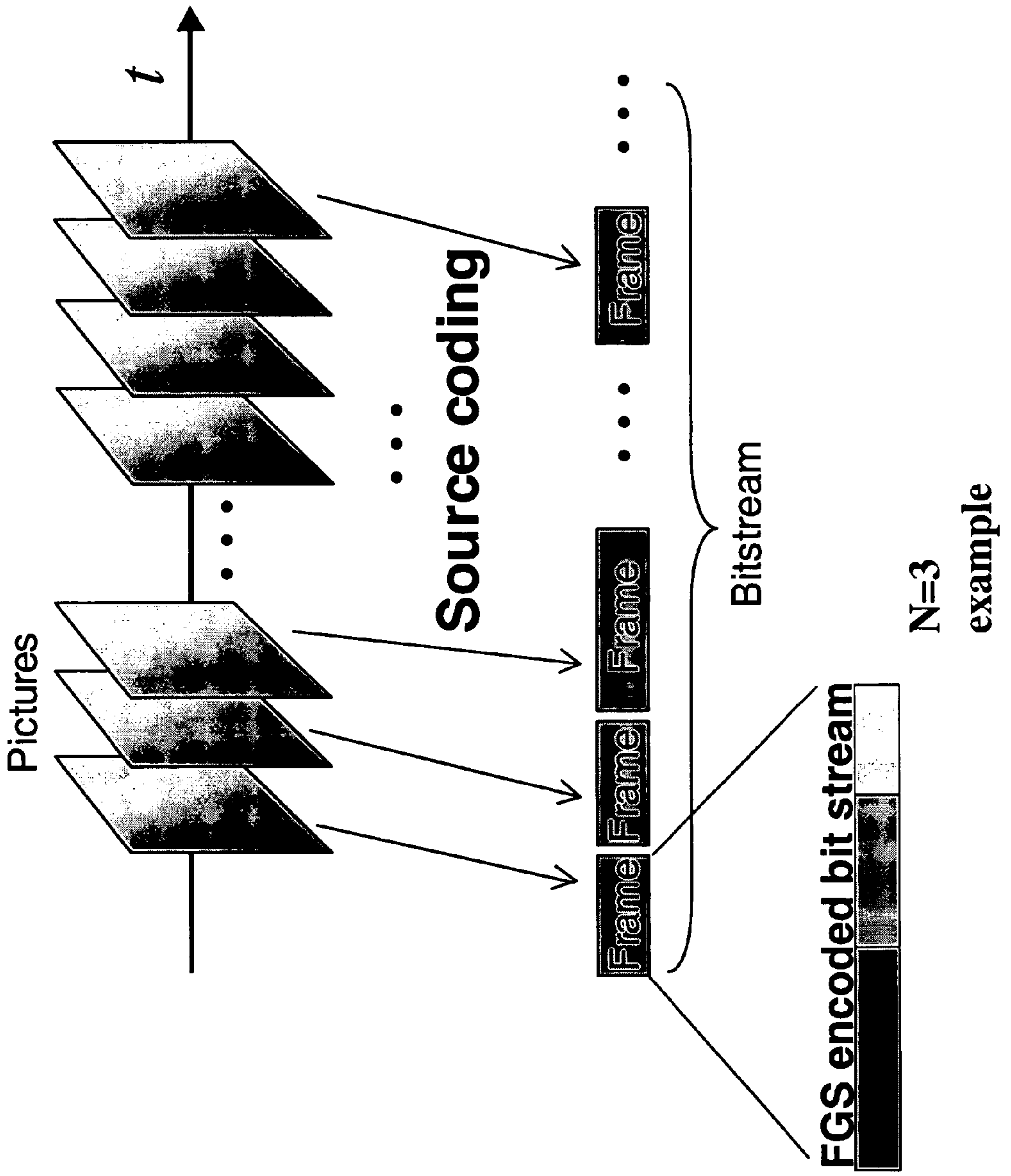
FIG. 3 illustrates an example of dividing a bitstream frame in examples consistent with the present invention.
Figure 4:
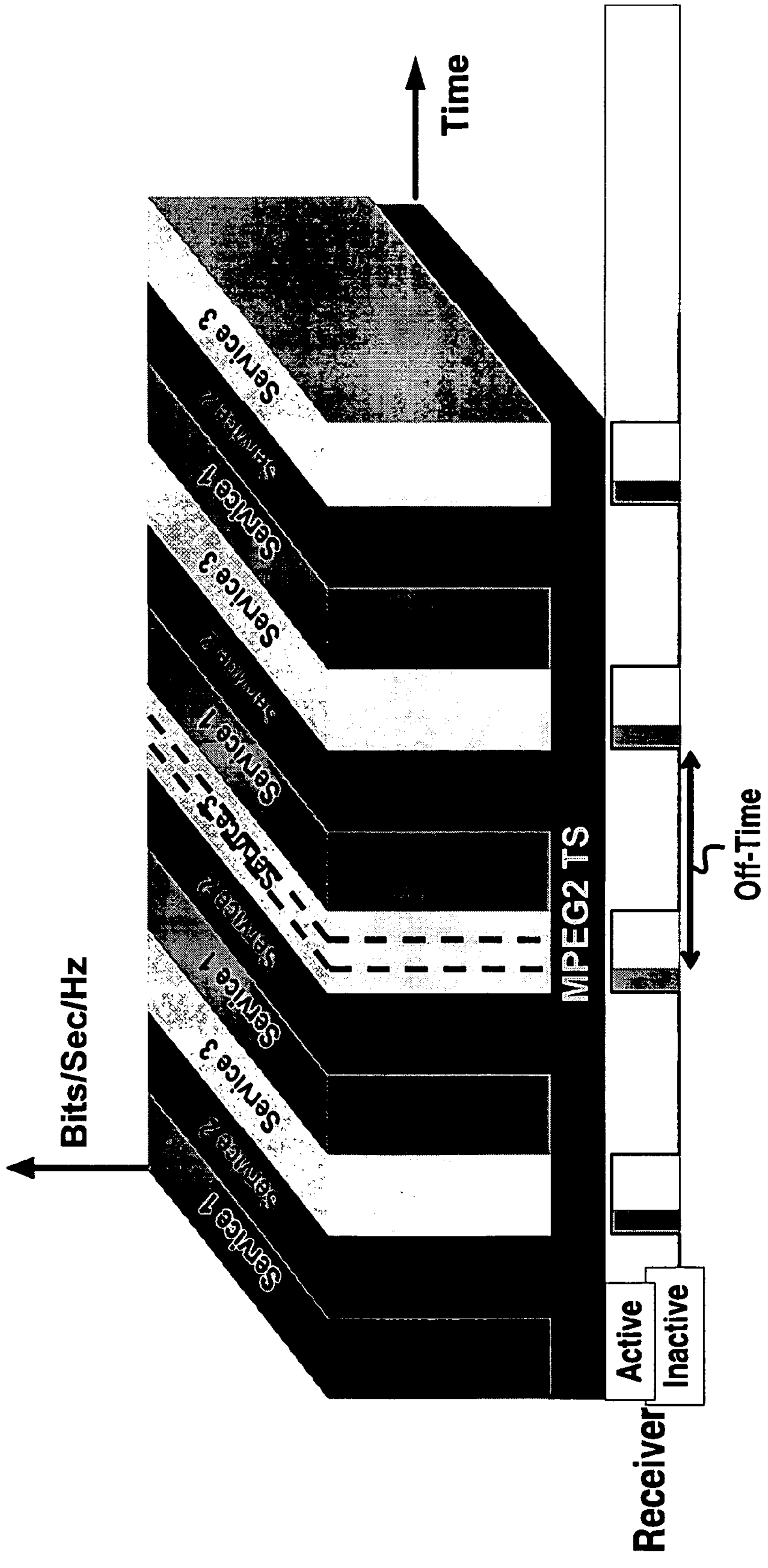
FIG. 4 illustrates an example of dividing a service into time-sliced portions in examples consistent with the present invention.

For example, referring to FIG. 3, a bitstream frame may be divided into three continuous portions of different significance levels, each occupying one time interval. FIG. 4 illustrates an example of how a time-sliced service of a multiple-service broadcast can be further divided into time-sliced portions. Referring to both FIGS. 3 and 4, if the more significant data are placed near the beginning, a system operating under a power-saving mode may ignore the data in the time interval(s) corresponding to the least significant portion(s) and may avoid some of the data processing operations, such as demodulation, channel decoding, and video decoding. For example, if one-third of the data is not processed, the power consumption may be reduced by approximately one-third. The reduced power consumption may extend the operating time of a battery-operated device by approximately one-third.

Using the concept illustrated in FIGS. 3 and 4, a bitstream frame may be divided into two, three, four, or any number of continuous portions, each portion may have a distinct level of significance and occupy a time interval. As a result, a system may enter one of the multiple operation modes that may dictate how much data of each frame is processed. Because some of the data in certain time interval(s) corresponding to one or more less significant portion(s) of a frame may be ignored, the system may reduce power consumption by activating the system or its processing only during certain time intervals and deactivating the system or its processing during other time intervals, such as the off-time interval illustrated in FIG. 4. Accordingly, a system, such as a system for receiving digital broadcast, may provide multiple power management or power-saving modes by varying the ratio or the percentage of the data processed. Also, increasing the number of the partitions associated with each bitstream frame may provide more flexibility in system power management.

Figure 5:
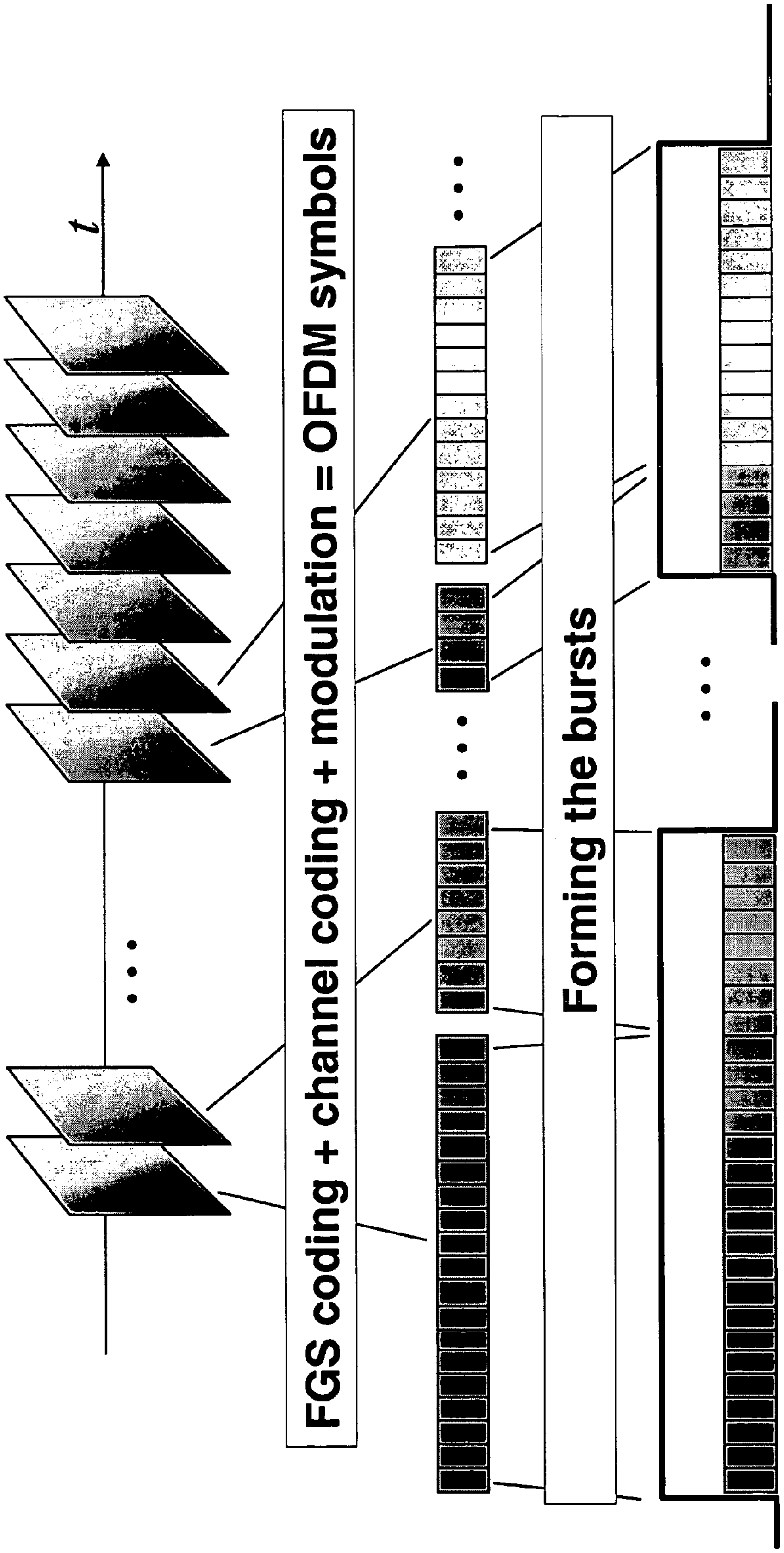
FIG. 5 illustrates an example of a partition-stream formation process in examples consistent with the present invention.

FIG. 5 illustrates an example of the partition stream forming process. In one example, the known transmission methods under the current standards, including the DVB-H standard, may be used to transmit the symbols frame by frame.

Figure 6A:
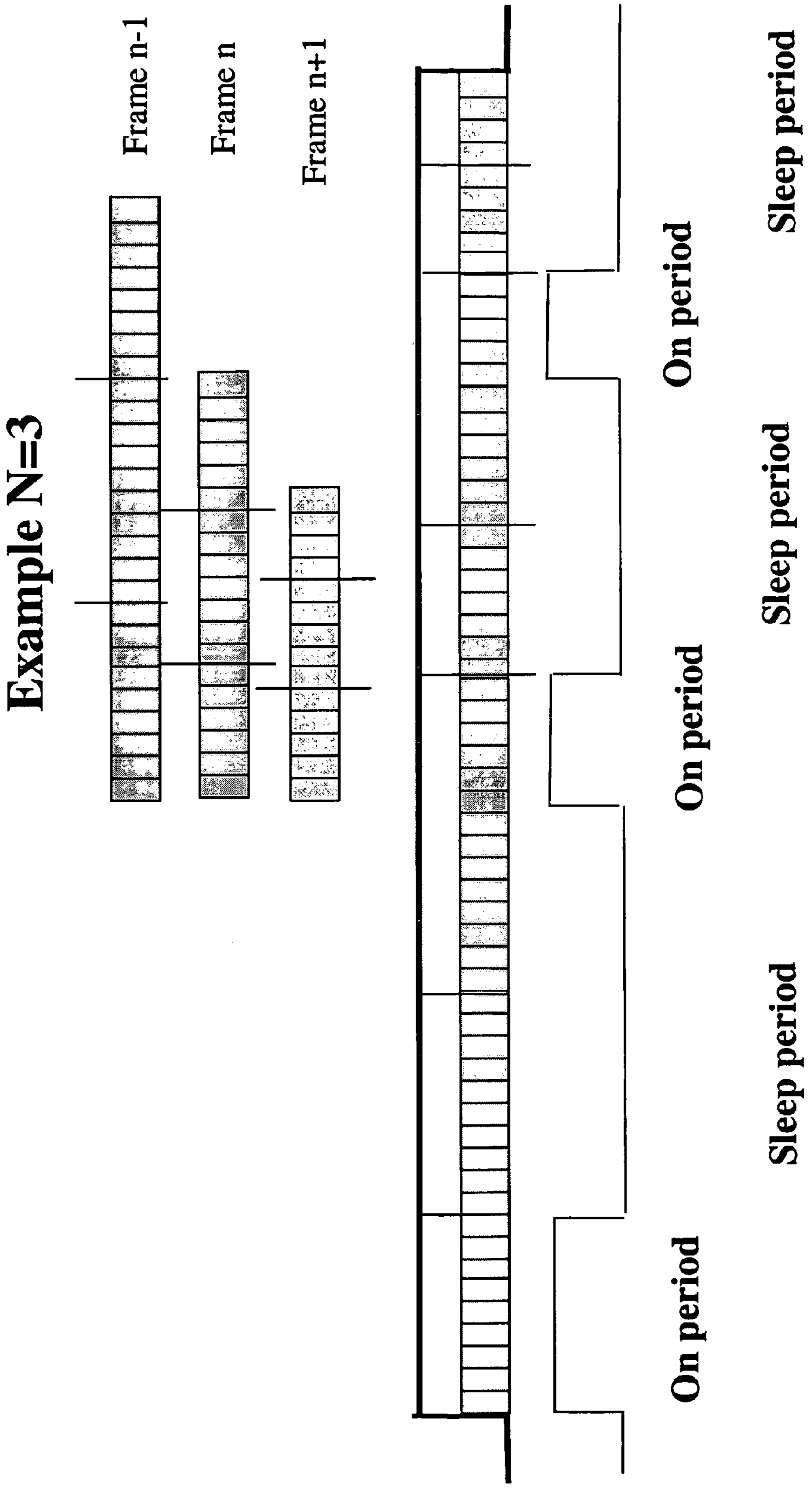
FIGS. 6*a*-6*b* illustrate an example of dividing each bitstream frame into three sections and a timing diagram showing the possible timing of processing only certain portions of orthogonal frequency division multiplexing (OFDM) symbols in examples consistent with the present invention.
Figure 6B:
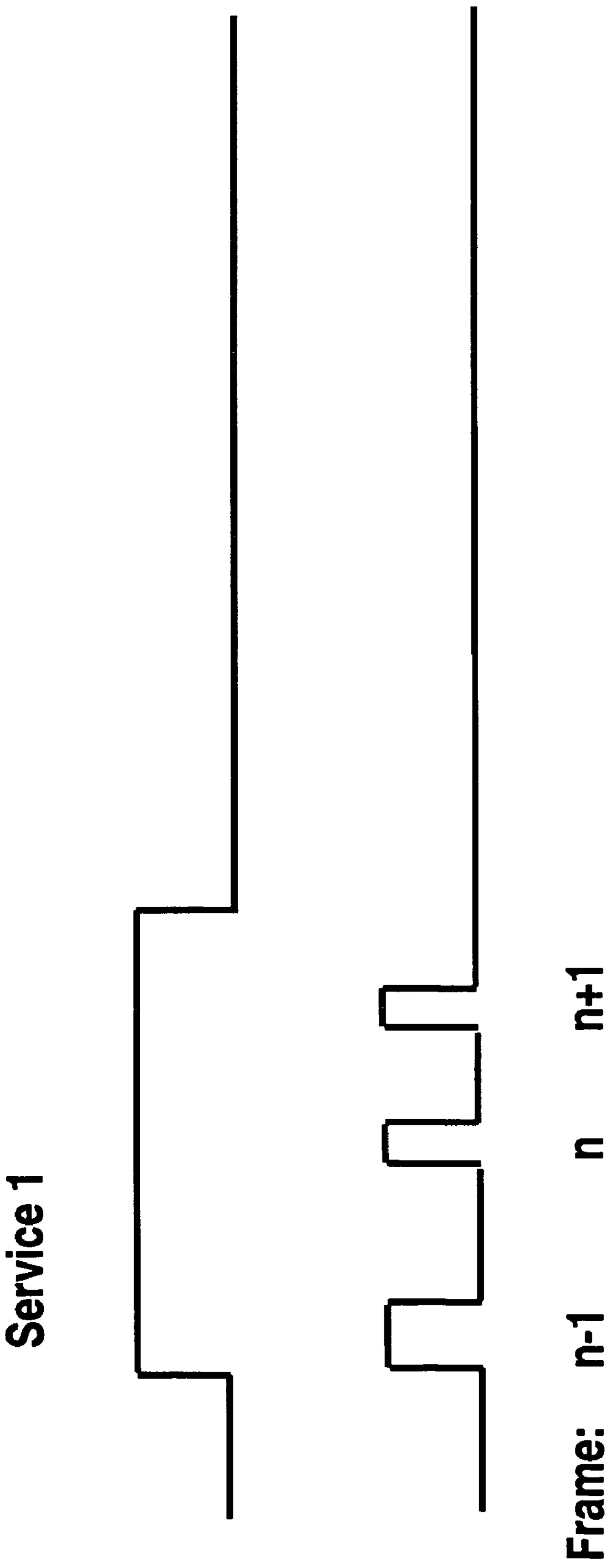

FIG. 6*a* illustrates an example of dividing each frame into three sections. The OFDM symbols, carrying data corresponding to different portions of the same or different frames, may be transmitted consecutively over time. A receiving system may choose to process the most significant portion of each frame and enter into a "sleep mode" or "sleep period" during the time intervals corresponding to less significant OFDM symbols. FIG. 6*b* illustrates an example of a timing diagram showing the possible timing of processing only the most significant portion of OFDM symbol of each frame. Referring to FIG. 6*b*, a broadcast signal may carry multiple services, each occupying different periods. In the example shown, the "active" period of service may allow the transmission of OFDM symbols corresponding to three frames, frames, n−1, n, and n+1.

Because the most significant OFDM symbol of each frame resides at the beginning portion of each frame, a receiving system in this particular example may have to repeat the activating-deactivating operations for three times in order to obtain the most significant data of the three frames. Therefore, under this approach, there may be a concern in some examples that both a broadcasting and a receiving system may need to keep track of multiple group boundaries to accurately identify the timing of each section and each frame. Additionally, the frequent on-off operations of a receiving system may affect power consumption, system design flexibility, and operational efficiency. To avoid those restrictions, the OFDM symbols may be reordered, as illustrated FIG. 7, to facilitate power management and system design flexibility.

Figure 7:
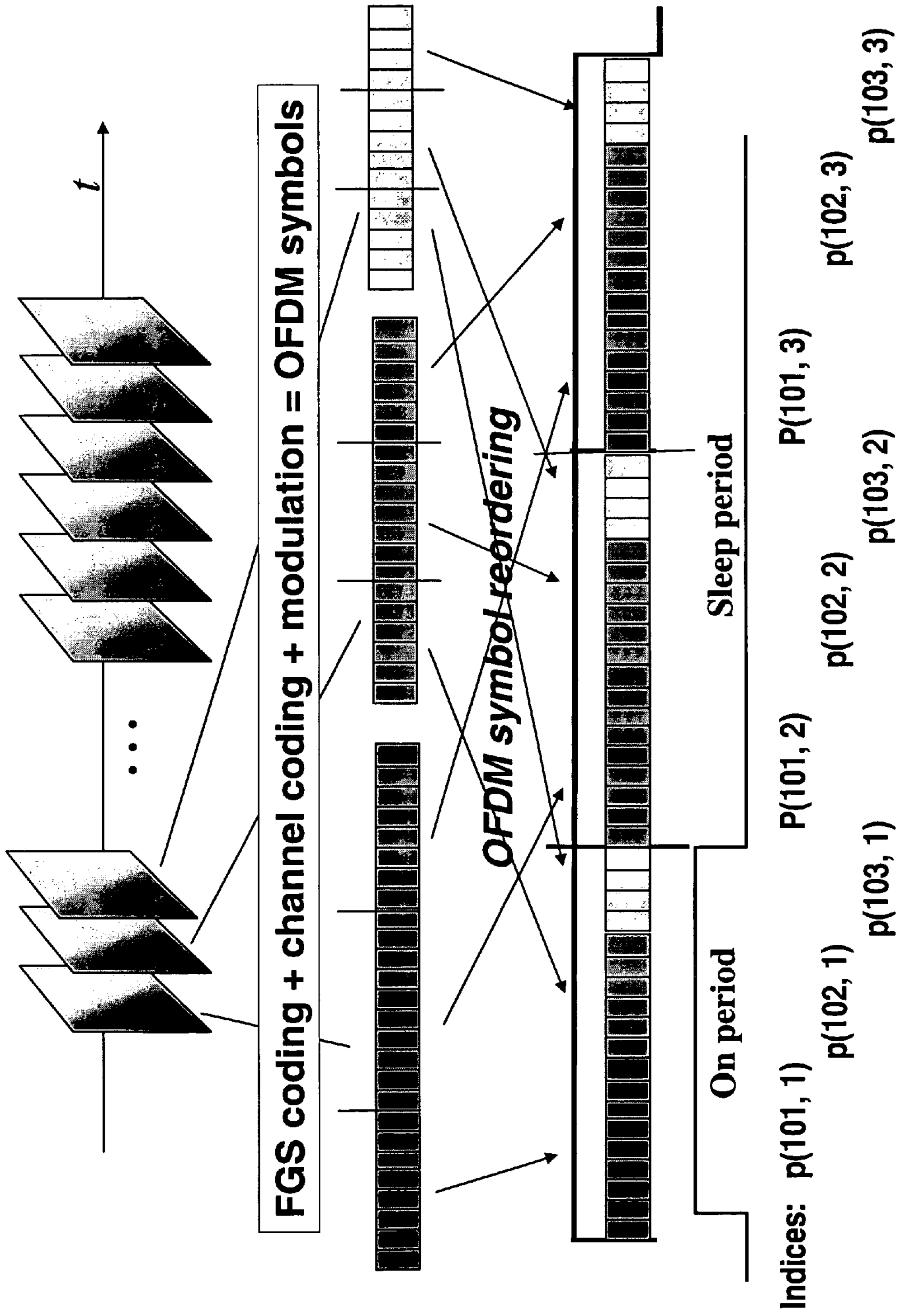
FIG. 7 illustrates an example of adopting frame partition and bitstream reordering in examples consistent with the present invention.

FIG. 7 illustrates an example adopting frame partition and bitstream reordering, which in some examples may be done before the physical layer. In one example, at the broadcasting front end, an encoded bitstream may include several consecutive bitstream frames. The frames may be partitioned into N equal portions, which may be indexed by frame portion number p(m, n), where m indicates the index of the bitstream frame, and n the index of the portion. Secondly, all portions with the same second index number (n) will be extracted out from their own bitstream frames and put together in the order according to index m to form N partition streams. Each partition stream is denoted by the common portion index.

In one example, a FGS bitstream may be partitioned and reordered appropriately to fit the burst size defined by a particular broadcast standard or specification, such as the DVB-H standard for time-slicing of multiple services. Referring to FIG. 7, by reordering the OFDM symbols, portions of the same level of significance from several frames, such as three frames in this example, can be grouped together. As illustrated in FIG. 7, the most significant portions (n=1) of frames 101, 102, and 103 are reordered to form consecutive OFDM symbols, i.e. p(101, 1), p(102, 1), and p(103, 1). Accordingly, when a receiving system is under a power-saving mode that processes only the most significant portion of each frame, the system is activated only for one "on period", rather than for three "on periods" illustrated in FIG. 6*b*.

Figure 8:
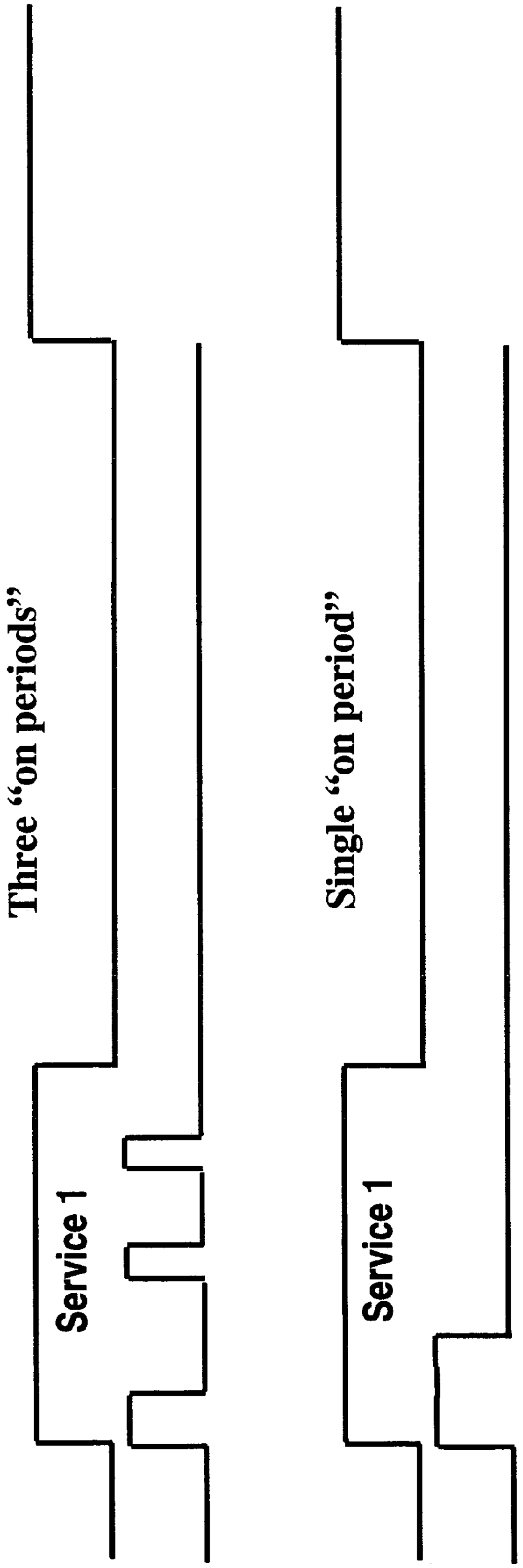
FIG. 8 illustrates an example showing the differences of system timing diagrams between one without OFDM reordering and one with OFDM reordering in examples consistent with the present invention.

FIG. 8 illustrates an example showing the differences of system timing diagrams between one without OFDM symbol reordering and one with OFDM symbol reordering. Compared to the approach illustrated in FIG. 6*a*, the approach illustrated in FIG. 7 allows a broadcasting and receiving system to keep track of fewer boundaries (of OFDM symbols) that are needed to accurately identify the timing of each section and each frame. However, depending on the broadcast specification and system design, the broadcasting and receiving systems may still need to keep track of many group boundaries and to accurately synchronize with the timing of the broadcast signals.

At a first glance, since the source is coded with FGS coding, each frame and time interval should be divided into arbitrarily smaller granularity than just one-third of the total. However, taking the characteristics of OFDM technology into account, the smallest possible granularity may be confined to the amount of data carried in one OFDM symbol defined by the DVB-H system, that is, one small time interval occupied by only one OFDM symbol. In the case that one OFDM symbol carries only a small portion of information bits in one frame, the above time-slicing based power management concept can be directly realized without much modification to the current DVB-H standard. However, this is not always the case. Let us consider one typical operation mode, defined in the DVB-H standard, of 8K sub-carriers, 16-QAM modulation and ½ coding rate for convolutional code. In 8K mode, the bitstream is carried by 6048 data sub-carriers (out of 8192 total sub-carriers). Therefore, with 16-QAM employed in each data sub-carrier, each OFDM symbol carries $6048\times4=24192$ bits of information of which only $24192\times\frac{1}{2}\times\frac{188}{204}\approx11147$ bits are actual source data, and the rest are redundant bits due to channel coding (factors ½ for convolutional code and $\frac{188}{204}$ for block code). Considering a compressed video of a bit rate equal to 384 Kbps and frame rate equal to 30 fps, each video frame is, on an average, of the length $384000/30=12800$ bits. Thus, every single OFDM symbol covers a number of bits only slightly less than that within a frame of the video on average. Recall that there are different picture types such as P, B and I in video coding, with P and B pictures of much less information than I pictures, indicating that there could be frames whose lengths are too short to be segmented over multiple OFDM symbols. This thus renders the "FGS over time-slicing mechanism" based power management impossible. Next, let us introduce the concept of partition streams, which may facilitate FGS based power management.

The following paragraphs illustrate an exemplary mechanism of forming frame partition streams for the purpose of time-slice-based power management.

To obtain a finer granularity, each bitstream frame may go through a preprocessor for partitioning and forming a new stream. A preprocessed partition stream is a stream formed by segments partitioned from different FGS coded video frames. In particular, if a granularity of 1/N of a frame is desirable, then each bitstream frame will be partitioned into N equal portions and each one would be eventually put into one OFDM symbol. Since frames are FGS coded each segment will have a significance level depending on its original position in the frame. All the segments in one partition stream have to be of the same significance level. If we index each segment based on its position in a frame with a number, say n∈{1, 2, . . . , N}, the same number will also be the index of the partition stream it is in. The processes of partition of each frame into multiple segments and formation of partition streams from the resultant segments are briefly illustrated in FIGS. 9*a* and 9*b*, respectively. The details of forming partition streams from the video frames are given below.

Figure 9A:
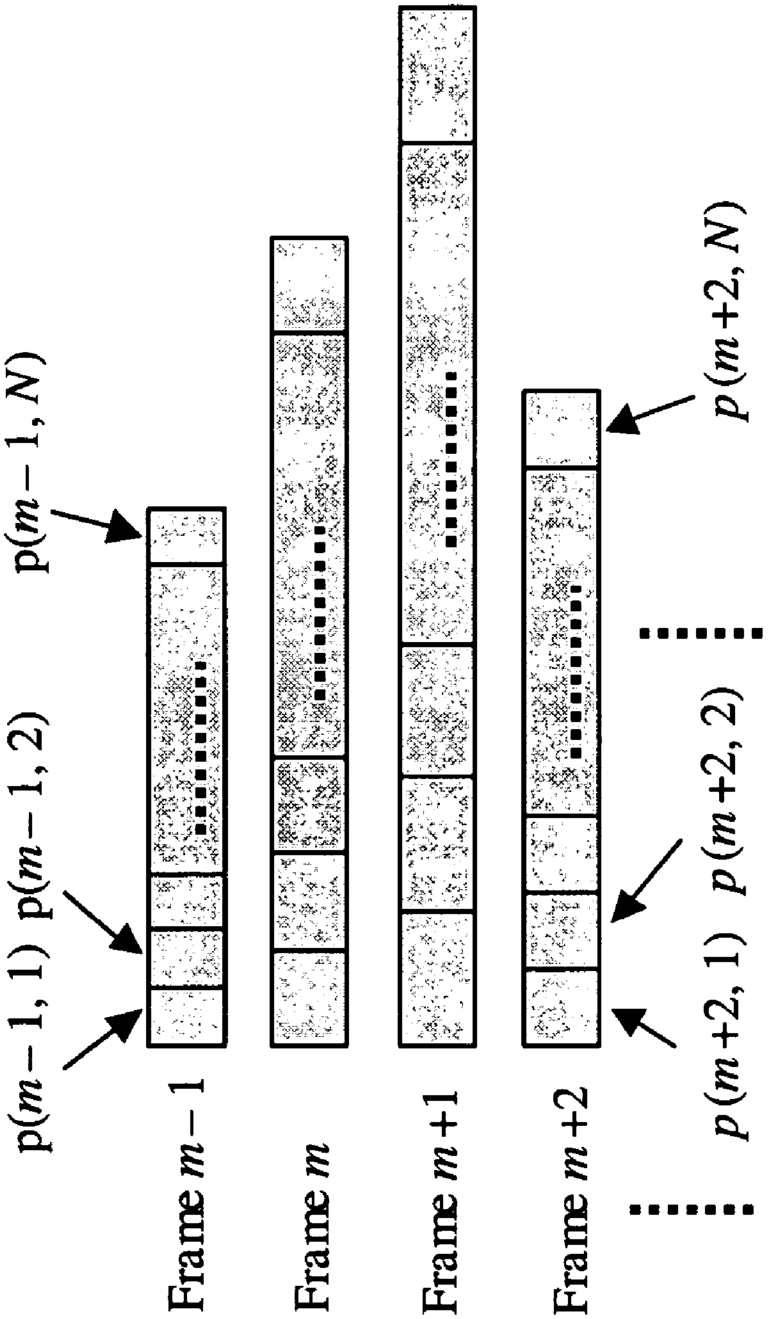
Figure 9B:
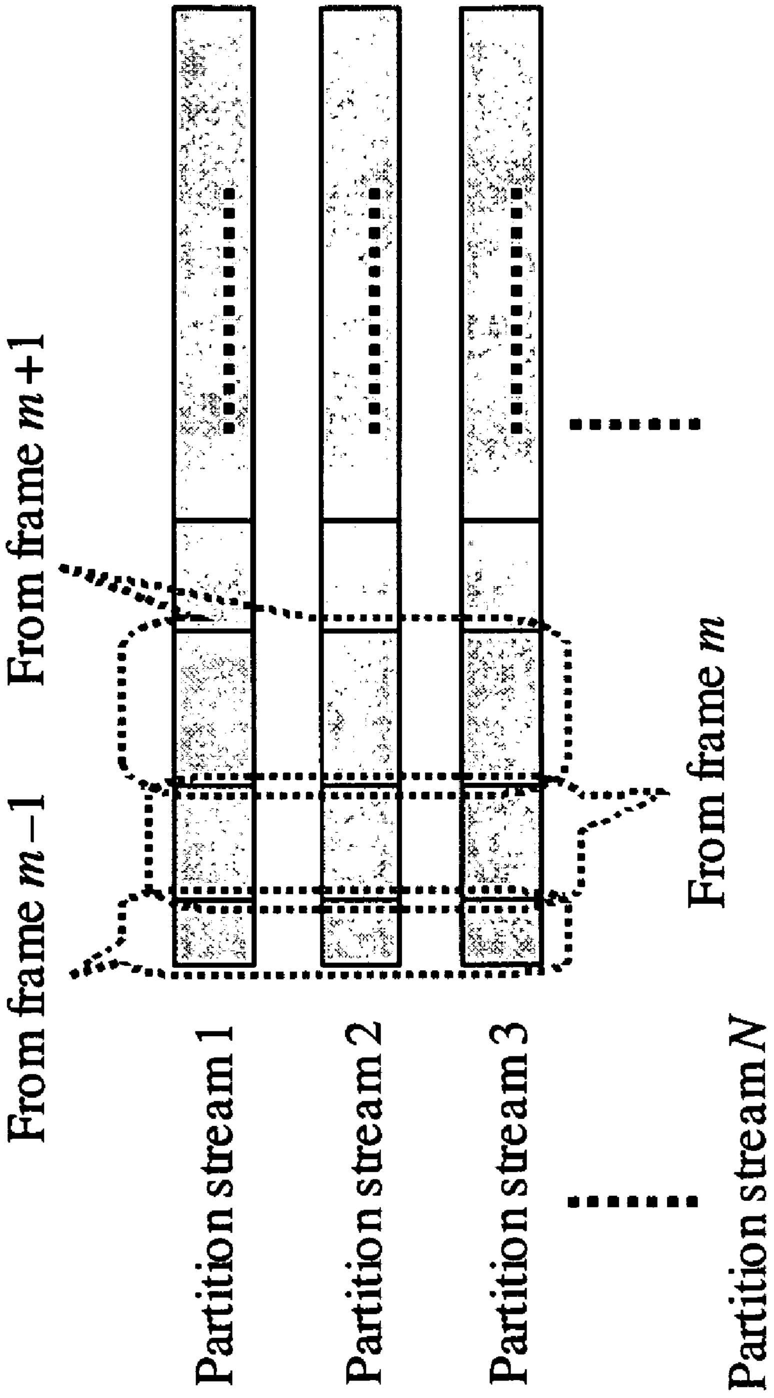

First, let consecutive video frames of different lengths be indicated as frame m−1, m, m+1, . . . as shown in FIG. 9*a*. If the system decides on the smallest power managing granularity to be 1/N of a frame, each frame will be partitioned into N equal segments, with each segment indicated by frame index m and segment index n as p(m,n). To form a partition stream all segments of the same segment index n are extracted from their frames and orderly put together to form a partition stream also indexed with the same index n, as shown in FIG. 9*b*. Repeating the process for n=1, 2, . . . , N will provide N partition streams. For example, partition stream 3 is composed of all portions indexed by p(m, 3) from different video frames. Since all frames are FGS coded and equally partitioned, the index n of a partition stream may indicate its significance in this specific video application, with higher number meaning less significance. Note that, since frames are equally partitioned, all partition streams will have the boundary of segments of the same index coinciding in time.

FIG. 9*c* illustrates a matrix for illustrating an efficient method of forming partition streams from the video frames. Referring to FIG. 9*c*, each column represents the data in one frame, which has multiple data sections or symbols (illustrated with multiple rectangular sections) with decreasing significance levels to the bottom. Each row represents data sections of the same level of significance, but from different frames, with later frames to the right. The consecutive data sections in one row hence form a partition stream. For example, the p(1,1), p(2,1), p(3,1), p(4,1), p(5,1), . . . in the first row constitute the first partition stream and the p(1,2), p(2,2), p(3,2), p(4,2), p(5,2), . . . in the second row constitute the second partition stream.

After the partition streams are formed, each partition stream will undergo separate channel coding, interleaving, and QAM modulation processes to keep significance levels assigned to each stream distinctive. When forming the OFDM symbols, a system may decide what information bits are to be included in one symbol. Since OFDM symbols of less significance are used to enhance quality to the corresponding OFDM symbols of higher significance of the same frame, the numbers of OFDM symbols associated with different significance within a burst duration should be the same in order to ensure correct frame synchronization. Assume that the total number of OFDM symbols to be sent in one burst duration is equal to Y. The burst duration shall be first equally divided into N time intervals, and then the nth time interval will be filled up with a group of Y/N OFDM symbols resultant from the nth partition stream. It is, of course, not difficult to manipulate the burst duration and choose the value of N so that Y/N is an integer. OFDM symbols of different significance will then fill up the burst duration assigned for the service, with OFDM symbols of higher significance placed closer to the beginning of the burst duration. Accordingly, each OFDM symbol may carry a definite significance level as assigned to the partition streams from which the symbol is formed. In this manner, a system for receiving the broadcast may achieve power saving by ignoring OFDM symbols with less significance.

Figure 9D:
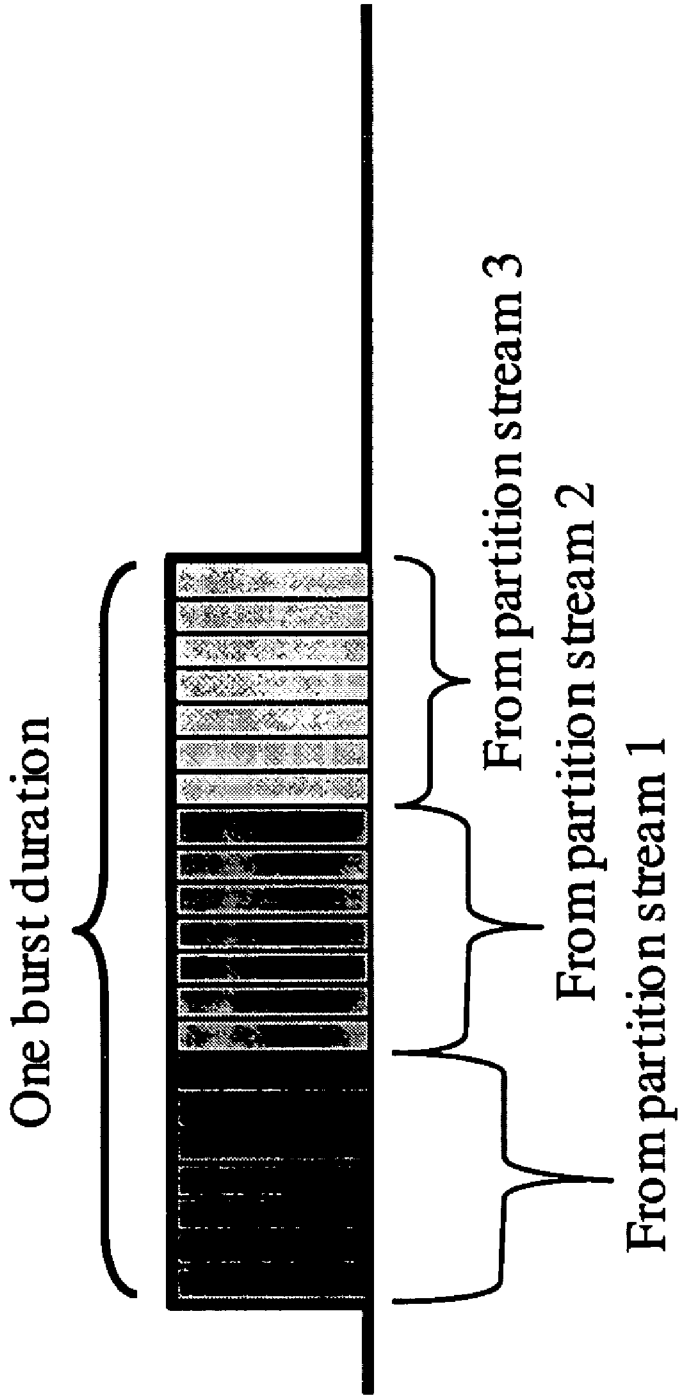

FIG. 9*d* illustrates an example in which there are 21 OFDM symbols taken from three partition streams to be sent in a burst. (Of course, in a typical case of DVB-H applications, there could be hundreds of OFDM symbols in one single burst.) Since there are only three partition streams, the burst duration is divided into three equal intervals. The first seven OFDM symbols, in this case, are formed from partition stream 1 assigned with highest significance level. Similarly, the next and the last seven OFDM symbols are formed from partition stream 2 with middle significance level and partition stream 3 with least significance level, respectively. This simple example shows that receivers will have three options for power management. More generally, with a preprocessing of forming N partition streams, receivers will have N options for power management.

The approach identified in FIGS. 9*a*-9*d* allows the data of the same level significance to be grouped in one layer, such as one FGS layer. However, some digital broadcast standards, such as the DVB-H standard, do not process partition streams independently. Therefore, depending on the standards used, the approach may not be compatible with some of the broadcast standards that are currently being used or proposed.

Figure 10:
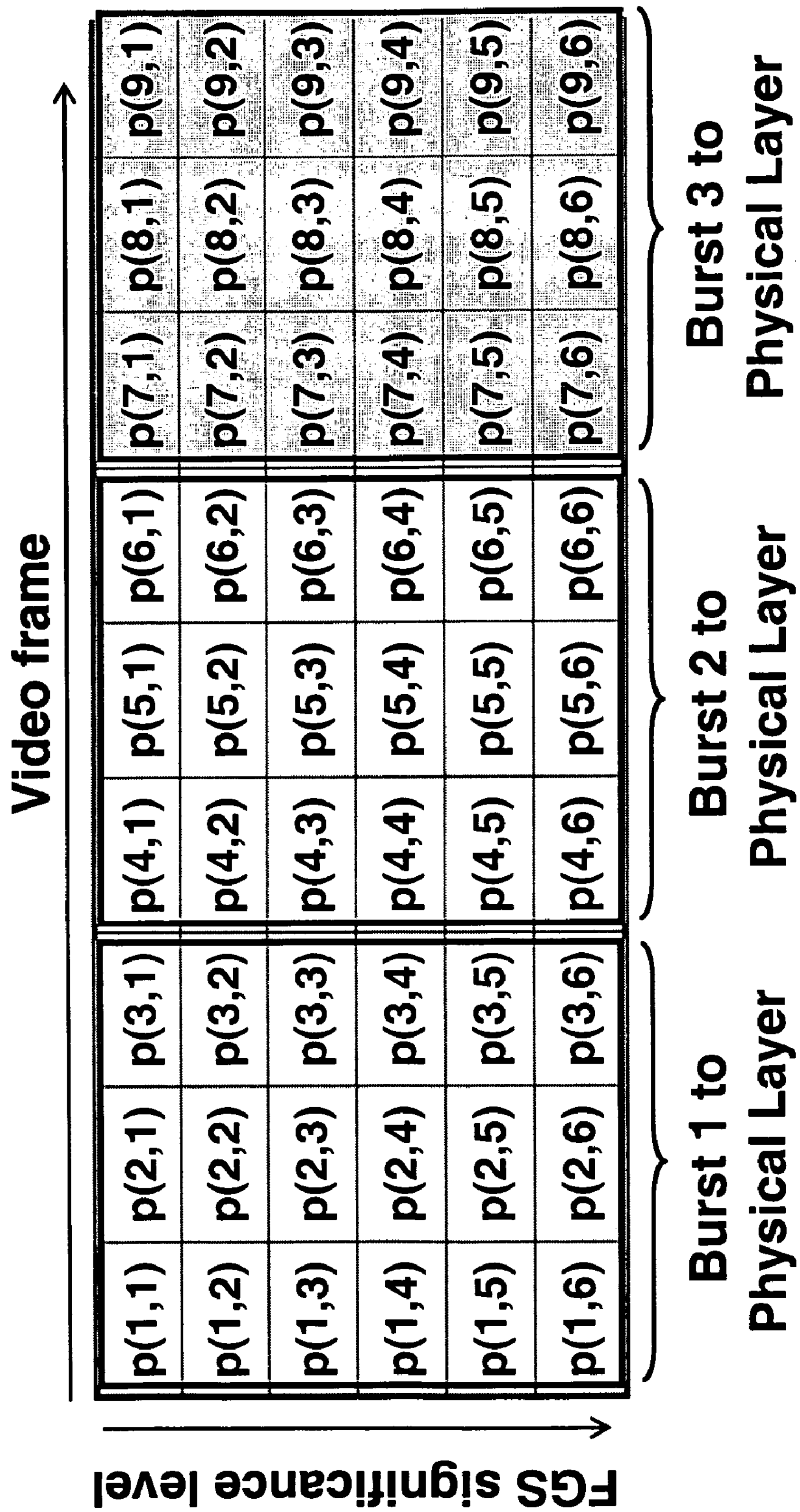
FIG. 10 illustrates another exemplary approach of frame partitioning and bitstream reordering in examples consistent with the present invention.

FIG. 10 illustrates an exemplary approach of frame partitioning and bitstream reordering that may provide better compatibility with known standards, such as the DVB-H standard. In one example, the FGS frame partition may occur before the physical layer processing of the data, and the bitstream reordering may also occur before the physical layer processing of the data. Referring to FIG. 10, the formed partition streams shown in FIG. 9*c* will be first sliced to several portions each fitting the burst size (number of bits to be transmitted in one burst duration) defined by the DVB-H standard. Then, the data sections in one portion will be transmitted in a certain order via the physical layer processing of DVB-H without any modifications on the DVB-H standard. For example, the data sections in the first portion will be transmitted in an order of p(1,1), p(2,1), p(3,1), p(1,2), p(2,2), p(3,2), p(1,3), p(2,3), . . . , p(1,5), p(2,5), p(3,5), p(1,6), p(2,6), p(3,6), and the data sections in the second portion will be transmitted in an order of p(4,1), p(5,1), p(6,1), p(4,2), p(5,2), p(6,2), p(4,3), p(5,3), . . . , p(4,5), p(5,5), p(6,5), p(4,6), p(5,6), p(6,6).

The above description of one embodiment assumes that all partition streams are formed with the same channel-coding rate. As each partition stream has been assigned with a particular significance level, it is possible (and also expected) that different partition streams can be unequally protected by the channel coding according to their significance levels. More specifically, the partition stream with a higher significance level could have a lower coding rate than those with lower significance levels. Under a variable coding-rate approach, portions, identified by indices p(m, n) in one example, of distinctive coding rates may have distinctive lengths. If different coding rates are to be employed, it is advised that the length of segments from each frame shall be decided proportionally to the associated code rates. For example, if each frame is to be partitioned into two segments (N=2), with the first segment using coding rate ½ and the second segment using coding rate ⅔, then ratio of the length of the two segment may be: ½:⅔=3:4. This will ensure equal length of the partition streams after channel coding and thus ensure proper timing when it comes to placing OFDM symbols in a burst.

As illustrated above, examples consistent with the present invention may provide systems and methods of flexible power management that are applicable to digital broadcasting, such as the digital broadcasting under the DTV and DVB-H standards. By applying one or more the approaches illustrated above, a portable or power-limited receiving system or device may achieve an adequate balance between battery lifetime and viewing quality to users. The examples of the systems and methods also allow a wide range or flexible power management, such as flexible application and control of different components, including from the RF components to application layer components. Also, the fine granularity feature of some examples allows a wide range of management schemes. Some examples also provide compatibility with known standards, including DVB-H, Digital Audio Broadcasting (DAB), or Digital Multimedia Broadcasting (DMB) standards.

In summary, the examples above may provide a system for receiving a digital broadcast. Depending on the design, the system may include an input terminal, a controller, a processor, and a power management device. The input terminal is capable of receiving the digital broadcast containing scalable data; the controller may control the operation modes of the system; the processor is capable of decoding the digital broadcast; and the power management device may vary the amount of data to be decoded ac-cording to the operation mode. In particular, the system may be designed to allow the power management device to vary the amount of data to be received by the input terminal, thereby reducing the power consumption of the system, which may be a handheld device operable with a battery power. As noted above, the scalable data may be data coded with FGS coding.

For the system in this example, the operation mode may be selected based on various factors, such as the total battery capacity of the system, the remaining battery capacity of the system, user's instructions, the quality of service selected by the system or a user, etc. The system may vary the amount of the data to be decoded by activating the processor at least during the intervals when the most significant portion of the scalable data is to be processed. Depending on the operation mode, the processor may be activated for longer intervals to decode additional portions of the scalable data. Additionally, the system may vary the amount of the data to be decoded by deactivating the processor at least during the intervals when the least significant portion of the scalable data is present. Depending on the operation mode, the processor may be deactivated for longer intervals to reduce power consumption.

In one example, the digital broadcast may include multiple bandwidth-channels, and one or more of the channels may include two or more services. In the context of digital broadcasting, each "service" may represent one particular that a user may choose to view. For example, one service may be a news program; another service may be a football game; etc.

In addition to a system for receiving a digital broadcast, the examples above may also provide a digital broadcasting system. The digital broadcast system may include a signal source capable of providing digital data containing at least one of audio data and video data and a data processing device capable of partitioning the digital data into at least two sections of partitioned data having different significance. In some examples, the system may include a channel coding device capable encoding at least a first broadcast service and a second broadcast service and placing the encoded data of the first and second broadcast services at distinct time intervals. In one example, the digital data comprises the encoded data.

In some examples, a data processing device may partition the digital data by scalable coding or fine grain scalability coding. Additionally, the data processing device may partition the digital data at least via encoding the partitioned data with at least two or more coding rates according to the significance of the encoded data. In some examples, the digital data may include multiple bitstreams for multiple frames and each bitstream is independently modulated and partitioned to form the partitioned data.

The digital broadcast system may also include a reordering device for reordering the partitioned data to consolidate symbols of same or similar significance from different bitstream frames. Furthermore, partitioning the digital data and reordering the partitioned data may both occur at a physical layer processing of the digital data or before the physical layer processing of the digital data.

The examples illustrated also provide a power management method for a receiving system of a digital broadcast. In particular, the method may include providing the digital broadcast containing scalable data; selecting an operation mode of the system; and varying the amount of data to be processed by the receiving system according to the operation mode selected. In some examples, the digital broadcast may include multiple-bandwidth channels, and one or more of the channels may include two or more services.

Accordingly, varying the amount of data to be processed may include activating a processing at the receiving system at least during the intervals corresponding to the most significant portion of each frame belonging to the service selected. To reduce power consumption, varying the amount of data to be processed may also include deactivating a processing at the receiving system at least during the intervals of a non-selected service. As noted above, the data of the two or more services in one channel may be placed at distinct time intervals.

The examples illustrated also provide a digital broadcasting method. The method may include providing data containing at least a first broadcast service and a second broadcast service; encoding the first broadcast service and the second broadcast service; placing a sequence of the encoded first service and a sequence of the encoded second service at distinct time intervals; and partitioning the sequence of the encoded first service into at least two sections of partitioned data according to the significance of the encoded data of the encoded first service. The various examples of coding techniques, including coding, partitioning, reordering, and varying coding rates, have been illustrated above.

The foregoing disclosure has been presented for purposes of illustration and description. It is not intended to be exhaustive or to limit the invention to the precise examples disclosed. As noted above, many variations and modifications to the described examples can be made. The scope of the invention is to be defined only by the claims appended hereto and by their equivalents.

What is claimed is:

1. A digital broadcasting system comprising:

a signal source configured to provide digital data containing at least one of audio data or video data;

a data processing device configured to partition the digital data into at least two sections of partitioned data having different significance, wherein the digital data comprises multiple frames each of which corresponds to a bitstream, and each bitstream comprises multiple bitstream frames each of which is independently partitioned to form the partitioned data; and a reordering device configured to reorder the partitioned data to consolidate symbols of the same or similar significance from different bitstream frames.

2. The system of claim 1, further comprising:

a channel coding device configured to encode at least a first broadcast service and a second broadcast service and place the encoded data of the first and second broadcast services at distinct time intervals.

3. The system of claim 1, wherein the digital data comprises the encoded data.

4. The system of claim 1, wherein the data processing device is configured to partition the digital data at least via a scalable coding or a fine grain scalability coding.

5. The system of claim 1, wherein the data processing device is configured to partition the digital data at least via encoding partitioned data with at least two coding rates according to the significance of the encoded data.

6. The system of claim 1, wherein the data processing device is configured to partition the digital data, and the reordering device is configured to reorder the partitioned data, at a physical layer processing of the digital data or before a physical layer processing of the digital data.

7. A digital broadcasting method comprising:

providing data containing at least a first broadcast service and a second broadcast service;

encoding the data of the first broadcast service and the data of the second broadcast service;

placing a sequence of the encoded data of the first service and a sequence of the encoded data of the second service at distinct time intervals;

partitioning the sequence of the encoded data of the first service into at least two sections of partitioned data according to the significance of the encoded data of the encoded first service, wherein the data of the first service comprises multiple frames each of which corresponds to a bitstream, and each bitstream comprises multiple bitstream frames, and wherein the sequence of the encoded data of the first service comprises multiple encoded bitstream frames each of which is independently partitioned to form the partitioned data; and reordering the partitioned data to combine at least two symbols of the same or similar significance from at least two bitstream frames, wherein encoding the data of the first and second broadcast services, placing the sequences of the encoded data of the first and second services, partitioning the sequence and reordering the partitioned data are performed by an apparatus comprising hardware configured to encode the first and second broadcast services, place the sequences of the encoded first and second services, partition the sequence and reorder the partitioned data.

8. The method of claim 7, wherein partitioning the sequence of the encoded first service comprises a scalable coding.

9. The method of claim 7, wherein partitioning the sequence of the encoded first service comprises at least one of a scalable coding or a fine grain scalability coding.

10. The method of claim 7, wherein partitioning the sequence of the encoded first service comprises encoding partitioned data with at least two coding rates according to the significance of the encoded data.

11. The method of claim 7, wherein partitioning the digital data and reordering the partitioned data occur at a physical-layer processing of the data.

12. The method of claim 7, wherein partitioning the digital data and reordering the partitioned data occur before a physical-layer processing of the digital data.

* * * * *